Sept. 13, 1966  W. G. HOLZBOCK ETAL  3,271,955
POWER TRANSMISSION
Filed April 12, 1965
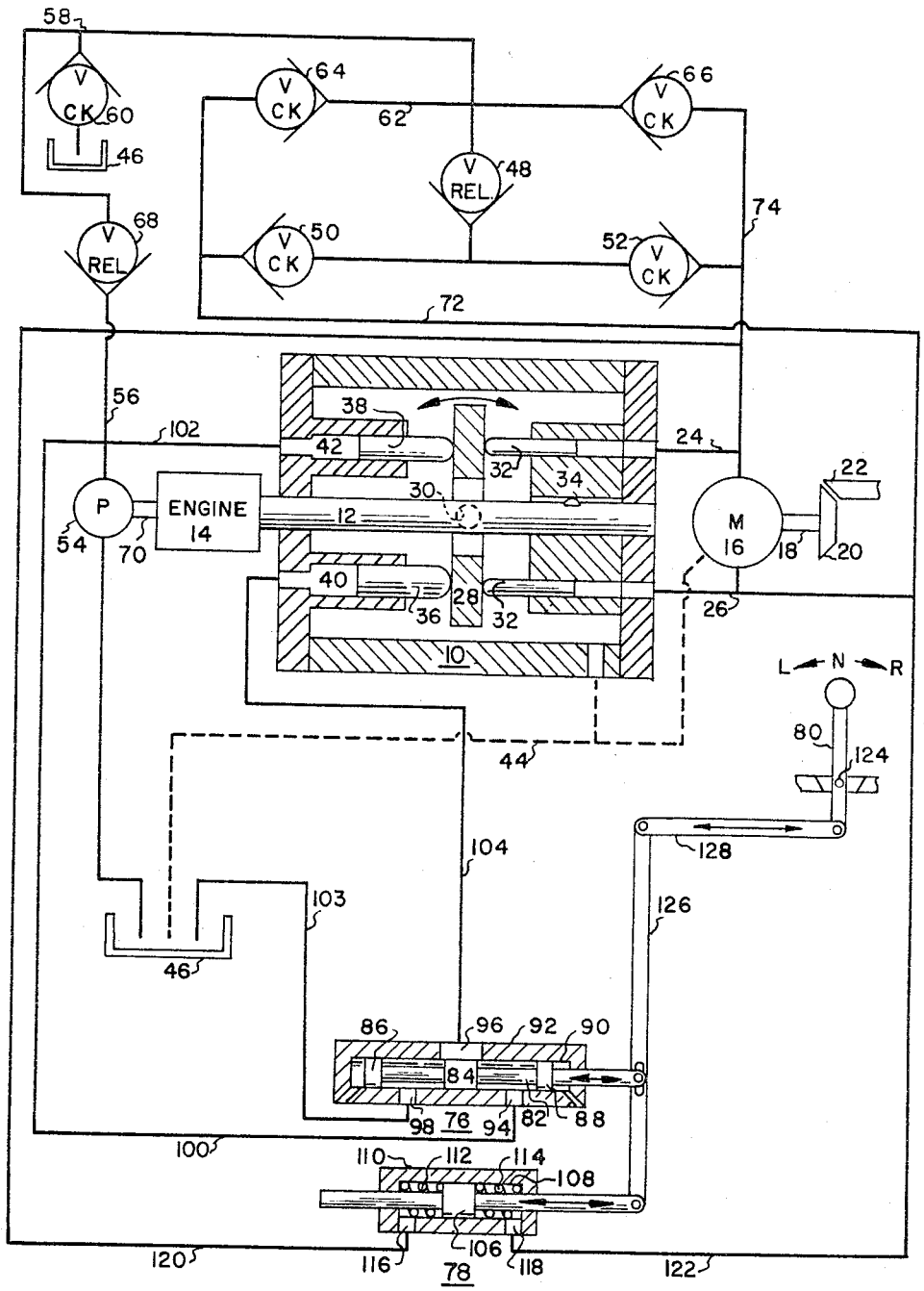
INVENTORS.
WERNER G. HOLZBOCK
CAREL J. MALI
BY *Van Meter and George*
ATTORNEYS

United States Patent Office 3,271,955
Patented Sept. 13, 1966

3,271,955
POWER TRANSMISSION
Werner G. Holzbock, Bloomfield Hills, and Carel J. Mali, Union Lake, Mich., assignors to Sperry Rand Corporation, Troy, Mich., a corporation of Delaware
Filed Apr. 12, 1965, Ser. No. 447,374
8 Claims. (Cl. 60—53)

This invention relates to power transmissions and is particularly applicable to those of the type comprising two or more fluid pressure energy translating devices, one of which may function as a pump and another as a fluid motor.

This invention is more particularly concerned with an all-hydraulic drive system for accelerating and decelerating loads having high inertia, such as the rotating cab of a lift crane, excavator, power shovel or other similar equipment.

This invention is particularly adapted for use on a lift crane where it is desirable to swing a heavily weighted object suspended from the boom of the crane from one position to another predetermined position without encountering an excessive pendulum motion of the weighted object.

Conventional practice in the construction equipment industry is to use friction clutch and brake swing-drive mechanisms to start, stop, and reverse the rotation of a vehicle cab. These mechanisms have numerous disadvantages. Smooth, accurate control is difficult to attain and maintain. Vehicles are often out of service to permit replacement of worn clutches and brakes. Maintenance costs are high.

It is therefore an object of this invention to provide an all-hydraulic swing-drive system wherein the conventional friction clutch and brake swing-drive mechanism is eliminated.

It is another object of this invention to provide a hydraulic transmission to accelerate or decelerate high inertia loads such as a vehicle cab body at a rate which is selectable by a manually operated lever and is automatically maintained at a rate proportionate to the displacement of the lever from its neutral position.

It is another object of this invention to provide a transmission which will generate a constant accelerating or decelerating force within the maximum operating capabilities of the fluid pressure energy translating devices, independent of their individual speeds.

It is a further object of this invention to provide an all-hydraulic, swing-drive system which will provide improved response, smooth operation, and provide the operator with an improved "feel" for the swing operation throughout its entire operating range.

A further object of this invention is to provide in the system aforementioned a variable displacement pump of the over-center type, i.e., its volumetric control element being movable between maximum displacement positions on opposite sides of a zero displacement position in order to both vary displacement and reverse the direction of flow through the circuit, and a fluid motor connected to the pump in a closed transmission circuit whereby the cab-body may be rotated at a controlled, automatically maintained accelerating or decelerating rate in opposite directions as required by the operator of the vehicle.

Further objects and advantages of the present invention will be apparent from the following description, reference being had to the accompanying drawing wherein a preferred form of the present invention is clearly shown.

In the drawing:
The single figure schematically illustrates a preferred embodiment of the present invention with the component parts of the elements comprising the transmission in a neutral position in which the hydraulic motor is at rest, although the propulsion engine of the vehicle may be in operation.

The system shown is adaptable to any machinery requiring accurately controlled acceleration and/or deceleration but is especially suitable for driving a rotatable cab of mobile or stationary equipment such as cranes, draglines and shovels. The circuit shown has been successfully applied to a swing-drive for a crane and will be described in connection with angular acceleration, coasting, and deceleration or braking operations of such a crane.

Referring to the figure, the swing-drive system shown herein comprises a power circuit, a replenishing circuit, and a control circuit, each of which is hereinafter described in detail.

*The power circuit*

The power circuit includes a reversible, variable delivery pump generally designated 10, whose drive shaft 12 is directly connected to a propulsion engine 14 of the vehicle and driven thereby. A conventional, reversible fixed displacement, rotary fluid motor 16, has a driven shaft 18 connected through a bevel gear 20 to a ring gear 22 which forms part of the vehicle cab, not shown. A pair of main conduits 24 and 26, each of which serves alternately as supply and return lines, connect the pump 10 and the motor 16 in a closed hydraulic circuit.

The pump 10 is illustrated as the swash plate type, although other reversible, variable displacement pumping mechanisms controlled as herein disclosed may be successfully utilized. The pump 10 includes the usual swash plate 28, movable about a trunnion 30 to vary the pump displacement between maximum displacement positions on opposite sides of the illustrated zero displacement position. The swash plate 28 is engaged by pumping pistons 32 which extend from a cylinder barrel 34 driven by the shaft 12. The means provided to actuate the swash plate 28 comprises two hydraulically opposed pistons 36 and 38 equally offset from the trunnion 30, said pistons being shiftable in cylinder chambers 40 and 42, respectively. The cross-sectional area of piston 36 of the preferred embodiment disclosed herein is approximately twice the cross-sectional area of piston 38. Each piston is responsive to the fluid pressure within its respective cylinder chamber thereby exerting a force on the swash plate 28 in proportion to its area and the pressure acting thereon. To maintain the swash plate 28 in any particular position, the fluid pressure in chamber 40 acting on piston 36 will be approximately 50 percent of the pressure in chamber 42 acting on piston 38, resulting in a zero net moment on the swash plate 28. This condition will be herein later referred to as the "balanced" condition. When the pressure in chamber 40 exceeds 50 percent of the pressure in chamber 42, the swash plate 28 will rotate in a counterclockwise direction from its illustrated zero displacement position increasing the displacement of pump 10 so that fluid will be delivered to motor 16 through conduit 24 resulting in what will for convenience be termed a counterclockwise rotation of motor 16, and conversely, when the pressure in chamber 40 is less than 50 percent of the pressure in chamber 42, swash plate 28 will rotate in a clockwise direction from its illustrated zero displacement position increasing the displacement of pump 10 so that fluid will be delivered to motor 16 through conduit 26 resulting in what will be termed a clockwise rotation of motor 16. A counterclockwise rotation of swash plate 28, when the motor 16 is rotating in a clockwise direction, will reduce the displacement of pump 10 reducing the flow delivered to motor 16 through conduit 26 and at the same time decreases the pump's ability to receive flow from the motor 16 through conduit 24 by virtue of its reduced displacement resulting in an increase in pressure in conduit 24. Similarly, pressure will increase in conduit 26 when swash plate 28 is rotated in a clockwise direction while motor 16 is rotating in a counterclockwise direction. Conduit 44 serves as the case drain line to return any internal leakage of pump 10 or motor 16 to a reservoir 46.

The relief valve 48 is operative when a predetermined pressure is exceeded in either of the power circuit conduits 24 or 26 to discharge excess fluid to the replenishing circuit and thus avoid generation of destructive pressures in the system. Check valves 50 and 52 are arranged, as shown, to permit high pressure fluid to flow to the relief valve 48 from whichever is the high pressure conduit through one of the check valves while the other prevents high pressure fluid from directly entering the low pressure conduit of the power circuit.

The replenishing circuit

The replenishing circuit includes a fixed displacement pump 54 connected by conduits 56 and 58 to a low pressure relief valve 60 adjusted to provide a desired replenishing pressure of approximately 50 p.s.i., and by conduit 62 to a pair of opposed check valves 64 and 66, one of which permits replenishing fluid to enter whichever is the low pressure conduit of the power circuit while the other check valve blocks the flow of high pressure fluid from the other power circuit conduit to the replenishing circuit. A pressure regulating means 68 interposed between conduits 56 and 58 maintains a constant pressure higher than the replenishing pressure for actuation of the control system later described. The pressure regulator 68, may be of the conventional spring biased, direct acting poppet type set to maintain a desired control pressure of, in the system described, approximately 400 p.s.i.

The pump 54 driven by the propulsion engine 14 through shaft 70 may be of a conventional type having a flow capacity sufficient to replenish the power circuit of any loss of fluid due to internal leakage of the pump 10 and/or motor 16 and to provide the motive fluid for actuating the pistons 36 and 38 to vary the displacement of the variable pump 10.

The opposed replenishing check valves 64 and 66 are connected by conduits 72 and 74 to the power circuit conduits 26 and 24, respectively.

The control circuit

The basic components of the control circuit include a generally designated control valve 76, a feedback unit generally designated 78, a manual control member 80 and control linkages 126 and 128 which connect valve 76, feedback unit 78 and member 80.

The control valve 76 comprises a movable spool 82 having a metering land 84 and two sealing and balancing lands 86 and 88. The spool 82 is slidable in a cylindrical bore 90 within the valve body 92, which valve body has a supply port 94, a control port 96, and an exhaust port 98. The width of the metering land 84 and the size of the control port 96 are in such a relationship as to provide a slightly open center condition, that is, the width of the sealing land is slightly smaller than the opening in control port 96.

Conduit 100 connects the supply port 94 to the control pressure in conduit 56 which, as previously noted, may be of the order of 400 p.s.i. Conduit 56 is also connected to cylinder chamber 42 by conduit 102, therefore, the pressure of the fluid in cylinder chamber 42 will be equal to the pressure of the fluid entering the control valve 76 through supply port 94.

With the spool 82 of valve 76 in the neutral position shown, fluid entering the supply port 94 of valve 76 will flow to the exhaust port 98 by virtue of the valve's slightly open center condition and will undergo a presure drop as it passes over the metering land 84 to control port 96 equal in magnitude to the pressure drop sustained as the fluid passes from control port 96 to exhaust port 98 at which point the fluid will be at substantially atmospheric pressure as it flows to the reservoir 46 through conduit 103. The fluid pressure in control port 96 will, therefore, be 50 percent of the pressure of the fluid entering the valve 76 through supply port 94 and 50 percent of the fluid pressure within cylinder chamber 42. This pressure relationship is maintained so long as the spool 82 is in the neutral position. The reduced pressure in port 96 will be conducted to cylinder chamber 40 through conduit 104 establishing the balanced condition wherein the forces exerted on the swash plate 28 by the pistons 36 and 38 will be equal, resulting in a zero net moment exerted on the swash plate 28.

Movement of the spool 82 controls the ratio of the fluid pressures in the cylinder chambers 40 and 42 and thereby controls the position of the swash plate 28. When the spool 82 is shifted to the left from its neutral position, the metering land 84 reduces the flow restriction between ports 94 and 96 and increases the flow restriction between ports 96 and 98. Consequently, the pressure in cylinder chamber 40 will increase. Since the pressure in cylinder chamber 42 remains unchanged and the pressure in cylinder chamber 40 has increased, the balanced condition no longer exists thus creating an unbalanced moment caused by the unequal forces exerted by the pistons 36 and 38 on the swash plate 28 causing the same to rotate in a counterclockwise direction. The effect of counterclockwise rotation of the swash plate 28 is dependent on the position of the swash plate 28 when such rotation is initiated. If counterclockwise rotation moves the swash plate 28 away from the centered position illustrated, the effect will be to increase the flow of fluid from the pump 10 through conduit 24 to motor 16 and thus accelerate motor 16 counterclockwise. If counterclockwise rotation moves the swash plate 28 toward the centered position illustrated, the effect will be to reduce the flow from the motor 16 through conduit 24 to the pump 10 and thus decelerate motor 16 from clockwise rotation. When the spool 82 is shifted to the right from its neutral position, the metering land 84 increases the flow restriction between ports 94 and 96 and reduces the flow restriction between ports 96 and 98. Consequently, the fluid pressure in cylinder chamber 40 will be decreased below that required for the balanced condition. Since the pressure in cylinder chamber 42 remains unchanged, an unbalanced moment is established causing the swash plate 28 to rotate in a clockwise direction. The effect of clockwise rotation of the swash plate 28 is dependent on the position of the swash plate 28 when such rotation is initiated. If clockwise rotation moves the swash plate 28 away from the centered position illustrated, the effect will be to increase the flow of fluid from the pump 10 through conduit 26 to motor 16 and thus accelerate motor 16 clockwise. If clockwise rotation moves the swash plate 28 toward the centered position illustrated, the effect will be to reduce the flow from motor 16 through conduit 26 to the pump 10 and thus decelerate motor 16 from counterclockwise rotation.

The feedback unit 78 comprises a spring biased, double acting, balanced area piston 106 slidable in a cylindrical bore 108 within the unit body 110 and opposed precompressed springs 112 and 114 retained in the bore 108 serving to centralize the piston 106. The unit body 110 has two ports 116 and 118 connected to the power circuit conduits 24 and 26 by conduits 120 and 122, respectively, subjecting the piston 106 to pressures of the fluid in the power circuit conduits. When the pressure in conduit 24 exceeds the pressure in conduit 26, the piston 106 will be moved to the right until the combined opposing hydraulic and spring forces are equalized. The position of the piston 106 when displaced from its neutral position will be proportional to the differential pressure existing between the power circuit conduits. When the pressure in conduit 26 exceeds the pressure in conduit 24, the movement of the piston 106 will be in the opposite direction in a similar manner.

The manual control member 80 is actuatable about a rigidly mounted trunnion 124 to a plurality of positions between maximum positions on opposite sides of the illustrated neutral position. The member 80 is connected to the valve spool 82 and the piston 106 by a walking beam 126 and a link 128. This linkage arrangement forms the association between the manual control member 80, the control valve 76, and the feedback unit 78 whereby the corresponding displacement of spool 82 will be proportional to an initial displacement of member 80 or a subsequent actuation of piston 106.

In operation with the system components, positioned as illustrated, and with the propulsion engine 14 operating, the motor 16 will be at rest. To initiate what has been described as a counterclockwise rotation of the motor 16, the operator moves the manual control member 80 to some predetermined position to the right of the illustrated neutral position. Simultaneously, the spool 82 is shifted proportionately to the left from its illustrated neutral position increasing the displacement of pump 10 such that fluid will be delivered to the motor 16 through conduit 24. The pressure in conduit 24 will begin to increase due to the rotational resistance of the motor and the vehicle cab, while the pressure in conduit 26 remains substantially unchanged, thereby establishing a pressure differential between the power circuit conduits. While the spool 82 remains displaced from its neutral position, the displacement of the pump 10 will continue to increase, further increasing this pressure differential. The feedback piston 106, the position of which being proportional to the pressure differential in the power circuit conduits, will be actuated toward the right until a pressure differential is established sufficient to actuate the piston 106 to a position that will return spool 82 to its neutral position restoring the swash plate 28 to a balanced condition. The pressure differential thereby established being proportional to the displacement of the member 80 from its neutral position. By maintaining this pressure differential at a constant value, a uniform or constant rate of angular acceleration of the motor will be achieved, proportional to the displacement of the manual control member 80. However, as the motor gains momentum, the pressure in conduit 24 will tend to decrease reducing the prior attained pressure differential, allowing the spring 114 to move piston 106 to the left. This movement displaces spool 82 proportionately to the left, increasing the displacement of pump 10 until the pressure differential resumes its prior value returning piston 106 to its prior position, restoring spool 82 to its neutral position. Thus, a constant pressure differential is automatically maintained proportional to the displacement of the member 80 from its neutral position, and thereby accelerating the motor 16 at a uniform angular rate proportional to the said displacement of the member 80.

It should now be apparent that the further the manual control member 80 is displaced from its neutral position, the further piston 106 must be actuated to restore spool 82 to its neutral position. Therefore, a proportionately greater pressure differential will be achieved, thereby the motor 16 will provide a proportionally higher rate of angular acceleration for the vehicle cab. In essence, the rate of variation in pump displacement is controlled by controlling the pressure differential in the power circuit conduits in proportion to the displacement of the manual control member 80 from its neutral position.

It will now be apparent that this system will provide any desired uniform rate of angular acceleration of the motor 16 until the pump 10 reaches its maximum displacement capacity. When this occurs, the pressure differential across the motor 16 will decay to that required to drive the motor 16 at a constant angular velocity proportional to the flow capacity of the pump 10.

Once the maximum or some intermediate cab velocity is achieved, the operator may desire the vehicle to coast which may be accomplished by returning the manual control member 80 to its neutral position. This would initially move spool 82 from its neutral position to the right decreasing the pressure in chamber 40 until the balanced condition is attained thereby equalizing the fluid pressure in the power circuit conduits 24 and 26. This allows piston 106 to return to its neutral position restoring spool 82 to its neutral position thereby maintaining the balanced condition. As the speed of the cab gradually decays due to resisting frictional forces, the fluid consumption rate of the motor 16 gradually decreases causing the pressure in conduit 24 to increase. To maintain the equalized pressure in the power circuit conduits 24 and 26, it would be necessary for the displacement of the pump 10 to be correspondingly decreased. This is continuously and automatically accomplished by the feedback unit 78. A pressure increase in conduit 24 would shift piston 106 to the right, shifting the control valve spool 82 to the right, allowing the fluid pressure in chamber 40 to decay below the balanced condition thereby reducing the pump 10 displacement until the pressures in the power circuit conduits were again equalized. This automatic sequence would continue until the vehicle gradually came to rest.

A rapid deceleration of the cab may be accomplished by moving the manual control member 80 from its initial accelerating position on the right to a position left of neutral. This would actuate the spool 82 to a position on the right of its neutral position and thereby reduce the displacement of the pump 10. Since the motor 16 would continue to rotate at substantially the same angular velocity attained during the acceleration cycle, due to the large inertia of the cab, the fluid returning to the pump 10 from the motor 16 through conduit 26 would begin to increase in pressure because of the pump's reduced capacity. Under these circumstances, the motor 16 would function as a pump, driven by the cab through the gearing arrangement 20 and 22 and shaft 18, and the pump 10 would function as a motor with the vehicle propulsion engine 14 constituting the respective load. The increasing pressure in conduit 26 establishes a pressure differential between the power circuit conduits 24 and 26 causing the feedback piston 106 to move to the left restoring spool 82 to its neutral position. As the speed of the motor 16 gradually decreases, the pressure differential decreases allowing the feedback piston 106 to move to the right shifting spool 82 to the right thereby further decreasing the pump 10 displacement. Therefore, the pump 10 displacement is uniformly decreased to maintain a constant pressure differential across the motor 16 to decelerate the cab at a uniform angular rate proportional to the displacement of the member 80 from its neutral position until the motor 16 is brought to rest, or when an intermediate desired angular velocity is reached, the manual control lever 80 may be returned to its neutral position permitting the cab to coast. If, however, the manual control member 80 were maintained in its deceleration position after the cab came to rest, the feedback piston 106 would return to its neutral position when the differential pressure in the power circuit conduits 24 and 26 become zero, causing the control valve spool 82 to assume a position right of its neutral position increasing the displacement of the pump 10 so that fluid would be delivered to the motor 16 through conduit 26 and thus reverse its direction of rotation.

In many crane applications, for example, in concrete construction, it is necessary to move the cement hopper suspended from the boom of the crane from a loading position to a pouring position. It is highly desirable to perform this operation smoothly and accurately without encountering oscillation or a pendulum motion of the hopper which would otherwise result in wasted motion and valuable time. This is accomplished through a precisely controlled sequence of boom movements. To illustrate, the vehicle cab is angularly accelerated so as to maintain the position of the boom ahead of the hopper. The boom is then decelerated as it approaches the pouring position allowing the hopper to swing ahead of the boom. When the hopper is over the pouring position, the boom is again accelerated and brought to rest directly above the hopper.

An important feature of this invention is that the vehicle cab may be accelerated or decelerated at a precisely controlled rate within the system's capacity, stopped or promptly reversed at any time during any operational cycle of the system, thereby providing a system capable of achieving this desired operational sequence.

It will now be apparent that the invention has provided an improved, all hydraulic, drive system for many types of applications wherein it is desirous to accelerate or decelerate an object at a controlled rate from one position to another and to reverse the direction of the object at any point during its operation. The hydraulic powered system herein disclosed, being so constructed as to eliminate the normally employed mechanical clutch and brake mechanism, provides a compact and rugged drive system which will efficiently perform the operation desired.

While the form of embodiment of the invention as herein disclosed constitutes a preferred form, it is to be understood that other forms might be adopted, all coming within the scope of the claims which follow.

What is claimed is as follows:

1. In a hydraulic transmission for controlling the acceleration of a fluid motor, the combination of:
   a pump connected to said motor and having a power operated displacement varying mechanism;
   control means for regulating said power operated displacement varying mechanism, said control means having a neutral position from which it is movable to accomplish regulation;
   an input member connected to said control means and capable of varying degrees of movement;
   a movable, pressure differential responsive feedback device connected to said control means, said device producing a movement proportional in magnitude to the applied pressure differential;
   and means for applying the pressure differential existing across said motor to said feedback device.

2. In a hydraulic transmission for controlling the acceleration of a fluid motor, the combination of:
   a pump connected to said motor in a closed circuit relation and having a power operated displacement varying mechanism;
   control means for regulating said power operated displacement varying mechanism, said control means having a neutral position from which it is reversibly movable to accomplish regulation;
   an input member connected to said control means and capable of varying degrees of movement;
   a movable, pressure differential responsive feedback device connected to said control means, said device producing a movement proportional in magnitude and sense to the applied pressure differential;
   and means for applying the pressure differential existing across said motor to said feedback device.

3. A hydraulic transmission comprising:
   a pump having an actuatable volumetric control element;
   a motor;
   conduit means connecting the pump and motor in a closed power circuit;
   a source of fluid pressure to provide motive fluid for the actuation of the volumetric control element;
   valve means hydraulically connected to the fluid pressure source and the volumetric control element, said valve means having a manual control member associated therewith, shiftable to neutral and actuating positions so as to direct the passage of motive fluid through the said valve means for actuation of said element to establish a pressure differential between the conduit means and thus accelerate or decelerate the motor;
   and means responsive to pressure differentials in the conduit means for controlling the passage of the motive fluid through the valve means to maintain a constant pressure differential between the said conduit means proportionate to the movement of the manual control member from its neutral position to assure a uniform rate of angular acceleration or deceleration of the motor.

4. A hydraulic transmission as defined in claim 3:
   in which the volumetric control element is actuatable so as to vary the displacement of the pump between maximum displacement position on opposite sides of a zero displacement position;
   in which the motor is reversible;
   and wherein the conduit means defining the closed power circuit between the pump and motor serves alternately as supply and return lines.

5. A hydraulic transmission as defined in claim 3:
   in which the means responsive to pressure differentials in the closed power circuit conduits comprises a double acting motor having an actuatable member proportionally responsive to the pressure differential established between said conduit means to automatically shift the movable member of the valve means.

6. A hydraulic transmission as defined in claim 5:
   in which the movable member and the actuatable member are connected by a common member to the manual control member whereby the movement of the movable member will be directly proportionate to an initial actuation of the manual control member or a subsequent responsive actuation of the actuatable member.

7. A hydraulic transmission as defined in claim 6:
   wherein the shiftable member has a neutral position having no actuatable effect upon the volumetric control element and a plurality of actuating positions on opposite sides of the said neutral position which controls the volumetric control element actuating the same to increase or decrease pump displacement and to reverse the direction of fluid flow to the motor through the conduit means.

8. A hydraulic transmission comprising:
   a variable displacement pump having a volumetric control element having opposed differential operable members hydraulically actuatable so as to vary the pump displacement between maximum displacement position on opposite sides of a zero displacement position;
   a fixed displacement motor of the reversible type for driving a load device;
   conduit means connecting the pump and motor in a closed power circuit, each of said conduits alternately serving as supply and return lines;
   means forming an auxiliary fluid pressure supply source connected at a controlled pressure to the closed power circuit for replenishing the same and connected by a supply passage at a controlled, relatively higher constant pressure to one of said operable members for actuation of the volumetric control element;
   and a two stage control means having a manually operable first stage and a pressure responsive second stage, said first stage being connected to the supply passage and to the said other operable member and which stage includes a shiftable member actuatable to a plurality of operative pump displacement varying positions on opposite sides of a non-operative neutral position by a manual control member having a plurality of actuating positions on opposite sides of a neutral position, displacement of said shiftable member being proportional to the displacement of the said manual member, said second stage having a spring biased pressure responsive member interposed between fluid pressure chambers independently connected to the power circuit conduit means and proportionally actuated by pressure differential established therein, said pressure responsive member being associated with the said first stage shiftable member in a manner to restore the latter to its neutral position subsequent to its initial actuation by the displacement of the manual control member from its neutral position when sufficient pressure differential is established in the power circuit conduit means thereby automatically maintaining a pressure differential between the said conduit means proportional to the displacement of the manual control member from its neutral position to any one of its plurality of actuating positions.

References Cited by the Examiner
UNITED STATES PATENTS

| | | | |
|---|---|---|---|
| 3,166,891 | 1/1965 | Weisenbach | 60—53 |
| 3,191,382 | 6/1965 | Weisenbach | 60—52 |
| 3,212,263 | 10/1965 | Hann | 60—53 |

EDGAR W. GEOGHEGAN, *Primary Examiner.*